(12) United States Patent
Edgren et al.

(10) Patent No.: US 11,887,562 B2
(45) Date of Patent: *Jan. 30, 2024

(54) AUTOMATED ADJUSTMENT OF HEAD UP DISPLAY IMAGE IN A VEHICLE

(71) Applicant: Volvo Car Corporation, Gothenburg (SE)

(72) Inventors: Claes Edgren, Trollhattan (SE); Elias Olsson, Gothenburg (SE)

(73) Assignee: VOLVO CAR CORPORATION, Gothenburg (SE)

(*) Notice: Subject to any disclaimer, the term of this patent is extended or adjusted under 35 U.S.C. 154(b) by 0 days.

This patent is subject to a terminal disclaimer.

(21) Appl. No.: 18/067,045

(22) Filed: Dec. 16, 2022

(65) Prior Publication Data

US 2023/0122637 A1 Apr. 20, 2023

Related U.S. Application Data

(63) Continuation of application No. 17/402,785, filed on Aug. 16, 2021, now Pat. No. 11,562,713, which is a
(Continued)

(51) Int. Cl.
*G02B 27/01* (2006.01)
*G09G 5/32* (2006.01)
(Continued)

(52) U.S. Cl.
CPC ............... *G09G 5/32* (2013.01); *B60K 35/00* (2013.01); *G02B 27/0101* (2013.01);
(Continued)

(58) Field of Classification Search
CPC ............... G09G 5/32; G09G 2340/045; G09G 2340/0464; G09G 2340/0492;
(Continued)

(56) References Cited

U.S. PATENT DOCUMENTS 8,912,978 B2 12/2014 Szczerba et al.
8,994,558 B2 3/2015 Kim et al.
(Continued)

FOREIGN PATENT DOCUMENTS

CN 106226910 A 12/2016
DE 102004050064 A1 4/2006
WO 2009/047200 A1 4/2009

OTHER PUBLICATIONS

Non Final office action received for U.S. Appl. No. 16/709,460 dated Oct. 7, 2020, 18 pages.
(Continued)

*Primary Examiner* — Adam R. Giesy
(74) *Attorney, Agent, or Firm* — Amin, Turocy & Watson, LLP

(57) ABSTRACT

Devices, methods and computer program products that facilitate automated adjustment of size or configuration of head up display image in a vehicle. A device can include a memory and a processor that executes computer executable modules. The computer executable modules can include: a head up display that generates an image visible to a driver of a vehicle within an eye box, a detection module that determines position of the driver's eyes or head relative to position of the eye box, and an adjustment module that adjusts size or configuration of the image within the eye box in response to the determined driver's eye or head position.

20 Claims, 11 Drawing Sheets

Related U.S. Application Data continuation of application No. 16/709,460, filed on Dec. 10, 2019, now Pat. No. 11,094,295.

(51) Int. Cl.
| | |
|---|---|
| *G06F 3/01* | (2006.01) |
| *G10L 15/22* | (2006.01) |
| *G06N 20/00* | (2019.01) |
| *G06N 5/04* | (2023.01) |
| *B60K 35/00* | (2006.01) |
| *G06V 20/59* | (2022.01) |
| *H04N 23/54* | (2023.01) |

(52) U.S. Cl.
CPC ......... *G02B 27/0179* (2013.01); *G06F 3/012* (2013.01); *G06F 3/013* (2013.01); *G06N 5/04* (2013.01); *G06N 20/00* (2019.01); *G06V 20/597* (2022.01); *G10L 15/22* (2013.01); *H04N 23/54* (2023.01); *B60K 2370/1529* (2019.05); *B60K 2370/164* (2019.05); *B60K 2370/166* (2019.05); *B60K 2370/167* (2019.05); *B60K 2370/21* (2019.05); *G02B 2027/0138* (2013.01); *G02B 2027/0187* (2013.01); *G10L 2015/223* (2013.01)

(58) Field of Classification Search
CPC ........... G09G 2340/14; G09G 2354/00; G09G 3/002; B60K 35/00; B60K 2370/1529; B60K 2370/164; B60K 2370/166; B60K 2370/167; B60K 2370/21; B60K 2370/149; G02B 27/0101; G02B 27/0179; G02B 2027/0138; G02B 2027/0187; G02B 2027/0181; G02B 27/01; G06F 3/012; G06F 3/013; G06F 3/167; G06N 5/04; G06N 20/00; G06V 20/597; G06V 40/18; G06V 40/172; G10L 15/22; G10L 2015/223; H04N 23/54
See application file for complete search history.

(56) References Cited

U.S. PATENT DOCUMENTS

| | | |
|---|---|---|
| 2016/0042501 A1 | 2/2016 | Huang et al. |
| 2016/0196098 A1 | 7/2016 | Roth et al. |
| 2017/0302913 A1 | 10/2017 | Tonar et al. |

OTHER PUBLICATIONS

Non Final office action received for U.S. Appl. No. 17/402,785 dated Apr. 13, 2022, 27 pages.

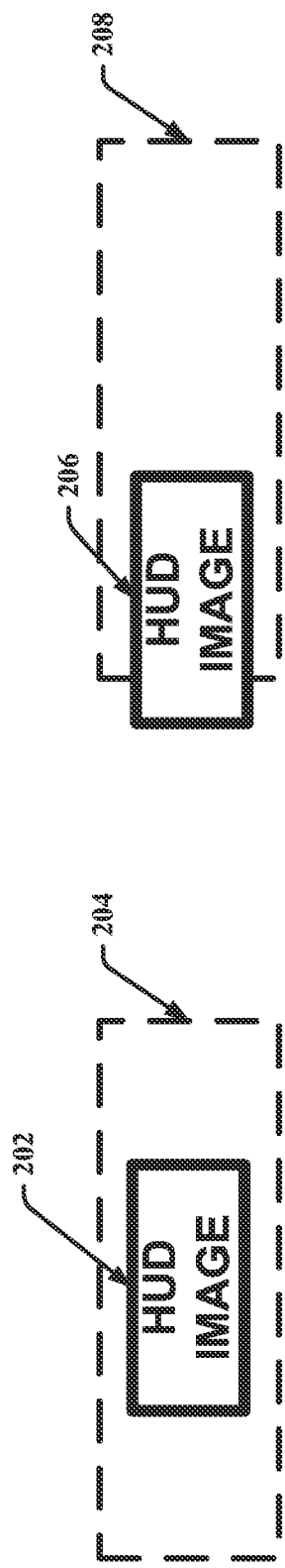
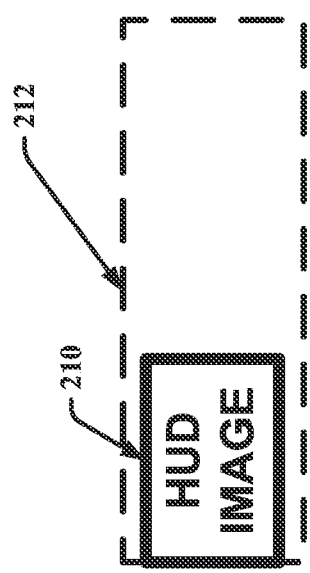

AUTOMATED ADJUSTMENT OF HEAD UP DISPLAY IMAGE IN A VEHICLE

CROSS REFERENCE TO RELATED APPLICATIONS

This application is a continuation of, and claims priority to each of pending U.S. patent application Ser. No. 17/402,785, filed on Aug. 16, 2021, entitled "AUTOMATED ADJUSTMENT OF HEAD UP DISPLAY IMAGE IN A VEHICLE", which is a continuation of, and claims priority to U.S. patent application Ser. No. 16/709,460, filed on Dec. 10, 2019, entitled "AUTOMATED ADJUSTMENT OF HEAD UP DISPLAY IMAGE IN A VEHICLE", now issued as U.S. Pat. No. 11,094,295. The entireties of the aforementioned applications are hereby incorporated herein by reference.

TECHNICAL FIELD

Embodiments disclosed and claimed herein relate to techniques that facilitate automated adjustment of size or configuration of head up display image in a vehicle.

BACKGROUND

A head up display (HUD) is most useful to a driver of a vehicle if the image generated by the HUD image is in the driver's line of sight. To achieve optimal use of a HUD, position of the HUD image can be adjusted to be visible from the driver's current eye or head position. As the driver is operating the vehicle, changes in the driver's eye or head position can require readjustments to HUD image position. Conventional HUD systems include manual controls that are not practical for adjustments by a driver while operating a vehicle. HUD systems can be improved such as described in CN106226910A and WO2009047200A1 by enabling an automatic adjustment of the position of the HUD image based upon monitoring of the driver's eye or head position. Such adjustment is accomplished by vertical adjustment of the eye box by means of movement of a mirror in the HUD system. However, some adjustments in the position of the HUD image resulting from changes in driver's eye or head position can result in some or all of the HUD image being positioned outside the eye box which comprises the limited area in which the projected HUD image is visible to the driver (e.g. some or all of the HUD image is obscured). This invention does not adjust position of the eye box, but instead adjusts size or configuration of the HUD image to move content within the HUD image away from the part of the HUD image that would be obscured to the part of the HUD image that remains visible to the driver given the eye or head position of the driver.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments described herein, devices, computer-implemented methods, apparatus and/or computer program products are presented that facilitate automated adjustment of size or configuration of head up display image in a vehicle.

In order to achieve optimal use of a head up display (HUD), position of the HUD image can be adjusted to be visible from a driver's current eye or head position. However, some adjustments in the position of the HUD image resulting from changes in driver's eye or head position can result in some or all of the HUD image moving outside the eye box which comprises the limited area in which the projected HUD image is visible to the driver (e.g. some or all of the HUD image is obscured). This problem can be mitigated by automated adjustment of size or configuration of the HUD image so that the content within the HUD image is still visible to the driver.

In accordance with an embodiment, a device comprises: a memory and a processor that executes computer executable modules. The computer executable modules can include a head up display that generates an image visible to a driver of a vehicle within an eye box, a detection module that determines position of the driver's eyes or head relative to position of the eye box, and an adjustment module that adjusts size or configuration of the image within the eye box in response to the determined driver's eye or head position.

In some embodiments, elements described in connection with the disclosed devices can be embodied in different forms such as a computer-implemented method, a computer program product, or another form.

DESCRIPTION OF THE DRAWINGS

FIGS. 2A-2C respectively illustrate an example of a non-limiting device that facilitates automated adjustment of size or configuration of head up display image in a vehicle in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Summary section or in the Detailed Description section.

Embodiments described herein include devices, methods, and computer program products that facilitate automated adjustment of size or configuration of head up display image in a vehicle. In order to achieve optimal use of a head up display (HUD), position of the HUD image can be adjusted to be visible from a driver's current eye or head position. However, some adjustments in the position of the HUD image resulting from changes in driver's eye or head position can result in some or all of the HUD image being positioned outside the eye box which comprises the limited area in which the HUD image can be projected by the HUD (e.g. some or all of the HUD image is obscured). This problem can be mitigated by automated adjustment of size or configuration of the HUD image so that the content within the HUD image is still visible to the driver. This is accomplished by adjusting size or configuration of the HUD image to move content within the HUD image away from the part of the HUD image that would be obscured to the part of the HUD image that remains visible to the driver given the eye or head position of the driver.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
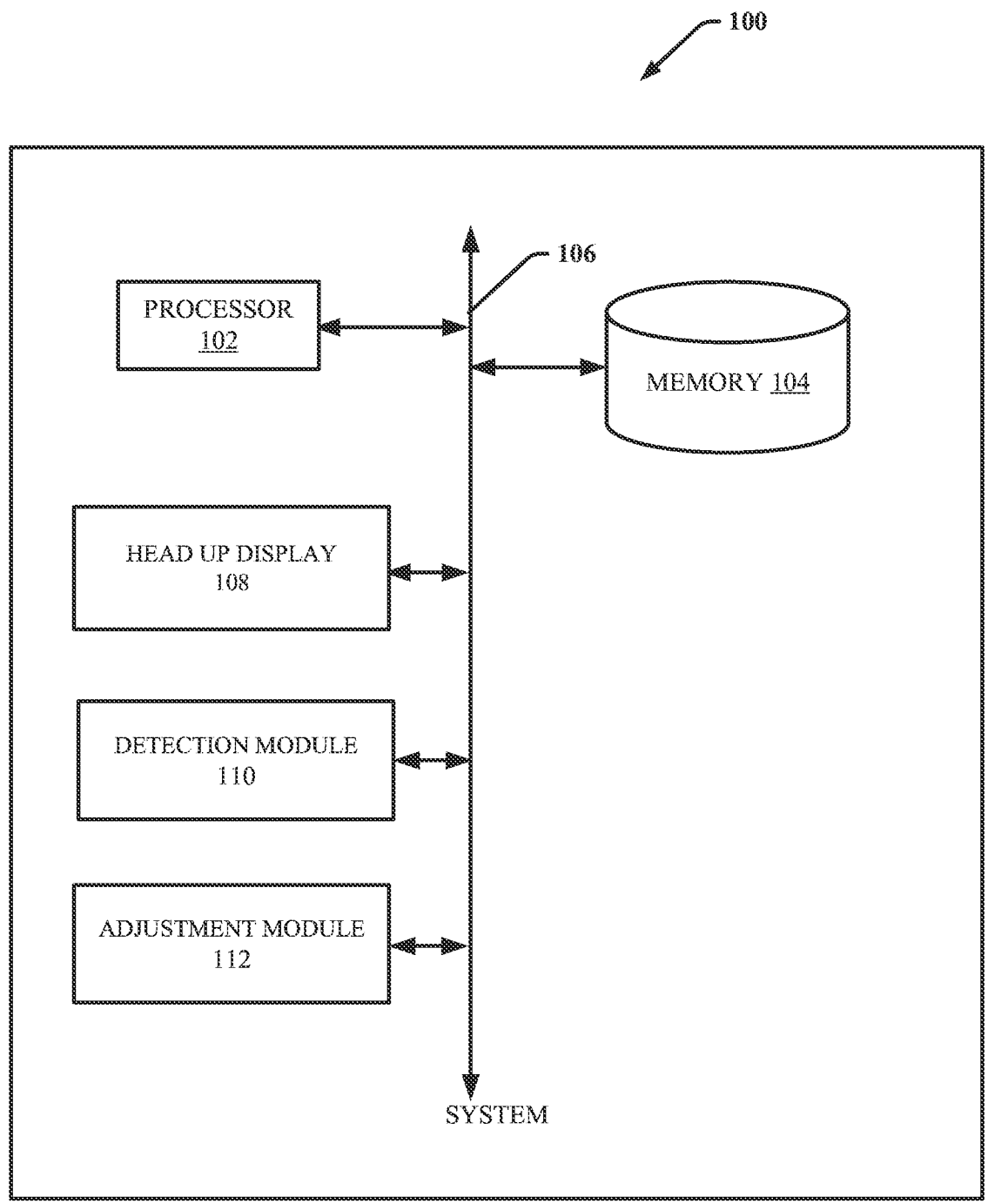
FIG. 1 illustrates a block diagram of an example, non-limiting device that facilitates automated adjustment of size or configuration of head up display image in a vehicle in accordance with one or more embodiments described herein.

Turning now to the drawings, FIG. 1 illustrates a block diagram of an example, non-limiting device 100 that facilitates automated adjustment of size or configuration of head up display image in a vehicle in accordance with one or more embodiments described herein. The device 100 includes a processor 102 that executes computer executable modules (or components) stored in at least one memory 104. The device 100 can further include a device bus 106 that can couple various modules, including, but not limited to, a head up display 108, a detection module 110 and an adjustment module 112. The head up display 108 generates an image visible to a driver of a vehicle within an eye box. The detection module 110 determines position of the driver's eyes or head relative to position of the eye box. The adjustment module 112 adjusts size or configuration of the image within the eye box in response to the determined driver's eye or head position.

In certain embodiments, the head up display 108 can generate an image visible to a driver of a vehicle within an eye box. For example, the head up display 108 can comprise an outer case, optical elements, electronics and a picture generating unit (PGU). The PGU can comprise a TFT display, lenses and LED backlight. Optical elements of the HUD can comprise a magnifying mirror and a folding mirror. In this example, light from the PGU is reflected by the magnifying mirror and the folding mirror through an opening in the instrument panel onto the windshield of the vehicle. The windshield reflects the light emitted by the HUD towards the driver's eyes, creating a virtual image (HUD image) that appears to be floating in the driver's field of view. The configuration of the HUD modules and the HUD position in relation to the windshield will determine the limited area in which a HUD image can be projected (referred to herein as the "projection field"). The eye box comprises the visible area within the projection field where the driver can view the complete HUD image based upon the driver's eye and head position. The size of the HUD image and distance between the driver and the HUD image will depend on variables such as size, magnification and distance between the optical elements of the HUD, size of the PGU and the total magnification in the optical system of the HUD. The width of the eye box is equal to the width of the projection field and the eye box position can move up or down to accommodate both high and low eye and head positions of the driver. The HUD can include graphics or text representing one or more categories of data generated by the vehicle's systems for the benefits of the driver and can be adjusted or customized using the vehicle's settings. Examples include data associated with speed, fuel level, navigation instructions, climate-control settings, entertainment settings and the like. Having such data projected as a transparent image in the field of view of the driver reduces the need for the driver to take the driver's eyes off the road.

In certain embodiments, the detection module 110 can determines position of the driver's eyes or head relative to position of the eye box. For example, the detection module 110 can utilize a driver monitoring system (DMS) that can monitor the position of the driver's eyes or head. The DMS can comprise a camera located on the dashboard of the vehicle. In another example, the DMS can comprise multiple cameras located on the dashboard or other locations within the vehicle. For example, if the driver turns the driver's eyes or head to the right, the detection module 110 can monitor such changes. Also, if the driver tilts the driver's head up to see further down the road ahead, the detection module 110 can monitor such changes and determine that the eye box has moved vertically. The detection module 110 can also detect changes in the driver's eye or head position resulting from changes the driver's seating position. In another example, the detection module 110 can track position of the driver's eyes. For example, the detection module 110 can track position of the driver's eyes as the driver scans the road ahead moving the driver's eyes from left to right and back. In another example, the detection module 110 can monitor when the driver takes the driver's eyes off the road or looks in the direction of a rear-view or side mirror in the vehicle.

In certain embodiments, the adjustment module 112 can adjust size or configuration of the image within the eye box in response to the determined driver's eye or head position. For example, as the driver's head or eye position moves, the adjustment module 112 can first adjust position of the HUD image to remain visible within the eye box. However, some adjustments in the position of the HUD image resulting from changes in driver's eye or head position can result in some or all of the HUD image being positioned outside the projection field. As a result, some or all of the HUD image will move outside the eye box and not be visible to the driver (e.g. some or all of the HUD image is obscured). In order to mitigate this problem, the adjustment module 112 will adjust size or configuration of the HUD image so that the content within the HUD image is still visible to the driver. This is accomplished by adjusting size or configuration of the HUD image to move content within the HUD image away from the part of the HUD image that would be obscured to the part of the HUD image that remains visible to the driver given the eye or head position of the driver.

In one example, the adjustment module 112 can adjust position of the HUD image vertically or horizontally. For example, if the driver tilts the driver's eyes or head upward in order to see further down the road ahead, the adjustment module 112 can determine that the driver's eyes have moved outside the eye box, and can adjust the vertical position of the HUD image to fit into the remaining unobscured display area. This adjustment can be accomplished by employing a mirror driver that changes the angle in the HUD's internal mirror. The adjustment module 112 can employ auto-position logic that continuously calculates the driver's eye position in relation to the eye box by utilizing information from the DMS to locate the driver's eyes, the angle of the HUD mirror and a table for HUD-specific and car-specific optical geometries. In another example, if the driver's eye or head position moves to the left or right, the position of the eye box does not change as the width of the eye box equals the width of the projection field. However, the driver's perception of the position of the HUD image within the eye box will adjust based on the driver's eye or head position. As the driver's eye or head position moves further to the left or right and closer to the edges of the eye box, the driver's perception of the position of the HUD image changes, and as the position of one eye moves outside of the eye box a portion of the HUD image will become obscured. At this point, the HUD image can be adjusted by the adjustment module 112 in size or configuration in order to remain visible to the driver. For example, the HUD image can be compressed to fit into the far edge of the eye box. In this example, the content within the HUD image will be smaller but still readable by the driver. Compression can be linear or nonlinear. With linear compression, each content component within the HUD image will be compressed to the same extent. With nonlinear compression, the extent of compression can vary among the content components. For example, if the HUD image comprises three content components arranged left to right, the content component closest to the edge of the eye box can be compressed while the other two content component remain unchanged. In another example, all three content components can be compressed, but the content component closest to the edge of the eye box can be compressed more than the other two. In another example, the shape of the HUD image can be adjusted. For example, the horizontal length of the HUD image can be compressed, and the vertical length of the HUD image can be increased. In this example, one or more of the content components within the HUD image can be compressed horizontally using linear or nonlinear compression. In addition, the size of the content components can be increased vertically. In another example, the configuration of the content components in the HUD image can be adjusted. For example, the order of placement of the content components from left to right within the HUD image can be adjusted. In another example, if the HUD image comprises three content components positioned side by side, and the shape of the HUD image has been adjusted by compressing the horizontal length of the HUD image and increasing the vertical length of the HUD image, the placement of the middle content can be adjusted vertically so that the three content components can fit within the adjusted HUD image without reducing the size of any of the content components. In another example, such adjustment in configuration can be combined with an adjustment in size of one or more of the content components. As referenced above, the adjustment module 112 can use one or more combinations of adjustments in size or configuration in order to adjust the HUD image in a manner that maximizes visibility of the HUD image for the driver.

In an embodiment, the adjustment module 112 can adjust size or configuration of the HUD image within the eye box in response to the determined driver's eye or head position if a portion of the HUD image is obstructed by the steering wheel or one or both of the driver's hands. For example, if the driver's eye or head position is lowered to see the road immediately ahead of the vehicle, the eye box will move to its lowest position, and the HUD image will move downward into the eye box. In this example, if the steering wheel or one or both of the driver's hands will obstruct the driver's view of the HUD image, the size of configuration of the HUD image can be adjusted to improve visibility of the HUD image for the driver.

In another embodiment, the adjustment module 112 can adjust size or configuration of the HUD image within the eye box in response to the determined driver's eye or head position if the steering wheel or one or both of the driver's hands obstruct the driver's view of other instruments in the vehicle. For example, the steering wheel or one or both of the driver's hands can obstruct the driver's view of the instrument cluster or central display in the vehicle's dashboard. In this example, the size or configuration of one or more content components within the HUD image can be adjusted by the adjustment module 112 in response to the content in the instrument cluster or central display that is obstructed by the steering wheel or one or both of the driver's hands. If information associated with vehicle speed in the instrument cluster or central display is obstructed, the adjustment module 112 can adjust the HUD image to highlight content associated with vehicle speed.

In another embodiment, the adjustment module 112 can utilize low pass filtering of the driver's eye or head movements to control the types of eye or head movements that will result in an adjustment of the HUD image. For example, a driver can make sudden or momentary eye or head movements while driving, and automated adjustments to the positioning of the HUD image or in the size or configuration of the HUD image in response to every eye or head movement of the driver can be distracting or annoying to a driver. In this example, the adjustment module 112 can filter out some or all of the driver's sudden or momentary eye or head movements so that such movements will not result in an adjustment of the HUD image.

FIGS. 2A-2C respectively illustrate yet another example of a non-limiting device that facilitates automated adjustment of size or configuration of head up display image in a vehicle in accordance with one or more embodiments described herein. Repetitive description of like elements employed in other embodiments described herein is omitted for sake of brevity. FIGS. 2A-2C depict examples of a HUD image that is adjusted as a result of a change in the driver's eye or head position. FIG. 2A depicts a HUD image 202 positioned inside an eye box 204 based upon the current position of the eyes or head of the driver of a vehicle. FIG. 2B depicts the HUD image 206 positioned at the far-left edge of the eye box 208 as the driver's eye or head position has moved to the left. In this example, the driver's eye or head position has moved far enough to the left that the HUD image 206 position corresponding to such eye or head position would be partially to the left of the left edge of the eye box 208 and thus partially outside the eye box 208. In this example, the entire HUD image 206 would not be visible to the driver. FIG. 2C depicts an example of how the example depicted in FIG. 2B can be prevented. In this example, the HUD image 210 is compressed and adjusted in shape as compared to the HUD image 206 in FIG. 2B in order to remain visible to the driver. The horizontal length of the HUD image 210 is compressed, and the vertical length of the HUD image 210 is increased.

Figure 3A:
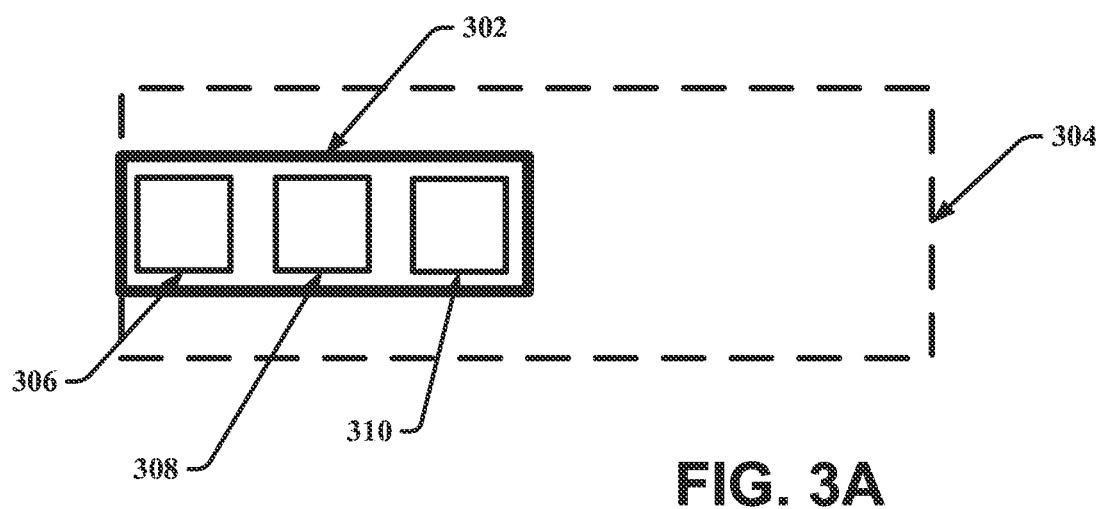
FIGS. 3A-3C respectively illustrate another example of a non-limiting device that facilitates automated adjustment of size or configuration of head up display image in a vehicle in accordance with one or more embodiments described herein.
Figure 3B:
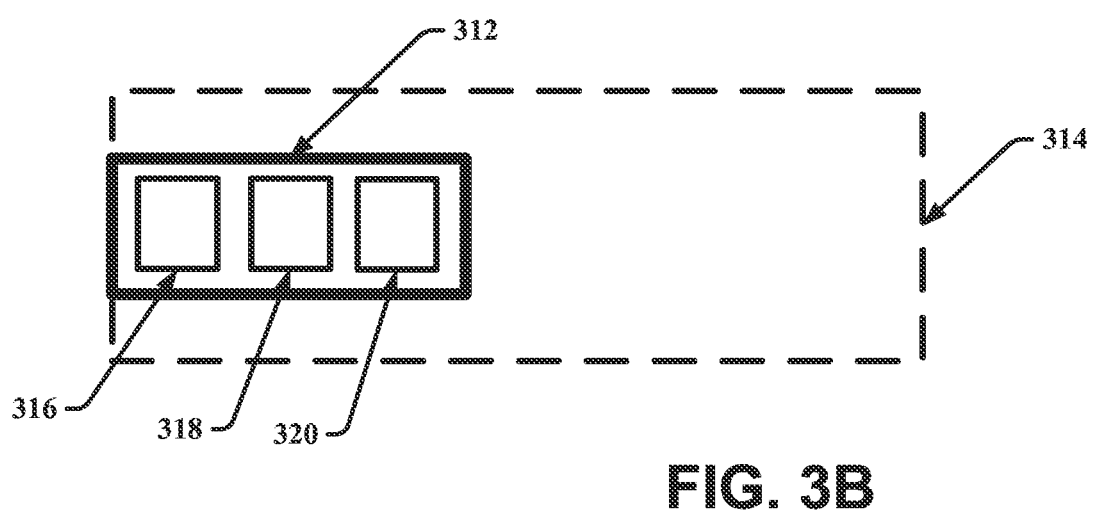
Figure 3C:
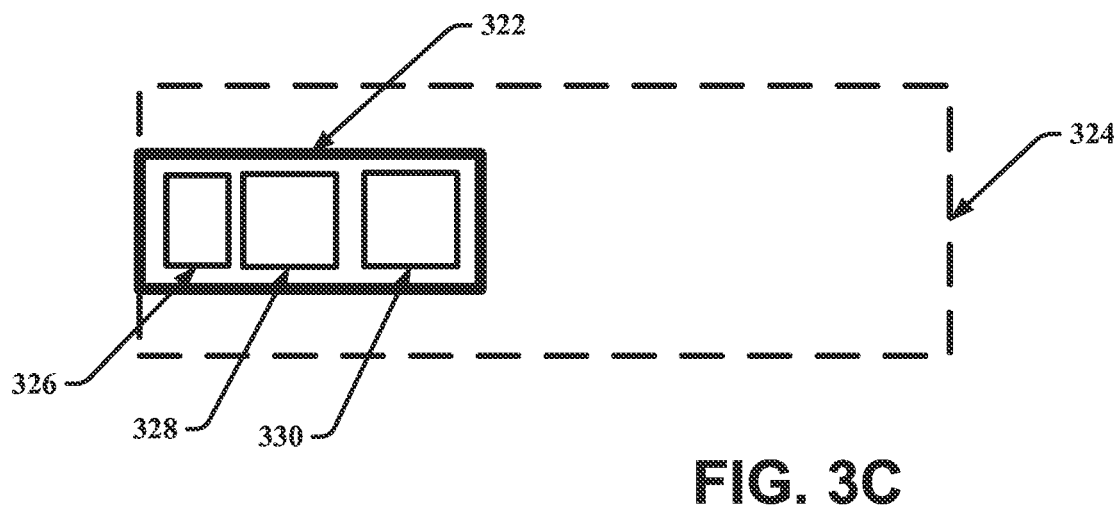

FIGS. 3A-3C respectively illustrate yet another example of a non-limiting device that facilitates automated adjustment of size or configuration of head up display image in a vehicle in accordance with one or more embodiments described herein. Repetitive description of like elements employed in other embodiments described herein is omitted for sake of brevity. FIGS. 3A-3C depict examples of adjustments in size of a HUD image and the content comprising the HUD image. FIG. 3A depicts a HUD image 302 positioned inside an eye box 304 at the far-left edge of the eye box 304 based upon the current position of the eyes or head of the driver of a vehicle. The HUD image 302 is comprised of three content components 306, 308 and 310. FIG. 3B depicts the HUD image 312 positioned inside the eye box 314 that has been compressed horizontally as compared to the HUD image 302. In this example, based upon the change in position of the eyes or head of the driver, the HUD image 312 would have extended beyond the left edge of the eye box 314. In order to prevent the HUD image 312 extending outside the eye box 314 and becoming partially obscured, the horizontal length of the HUD image 312 is compressed. Also, linear compression is applied to each of the content components 316, 318 and 320, causing the horizontal length of each content component 316, 318 and 320 to be compressed substantially to the same extent. FIG. 3C depicts the HUD image 322 positioned inside the eye box 324 that has been compressed horizontally as compared to the HUD image 302. In this example, based upon the change in position of the eyes or head of the driver, the HUD image 322 would have extended beyond the left edge of the eye box 324. In order to prevent the HUD image 322 extending outside the eye box 324 and becoming partially obscured, the horizontal length of the HUD image 322 is compressed. In this example, nonlinear compression is applied to the content components 316, 318 and 320, causing the horizontal length of only content component 316 to be compressed while the horizontal length of content components 318 and 320 remains unchanged.

Figure 4A:
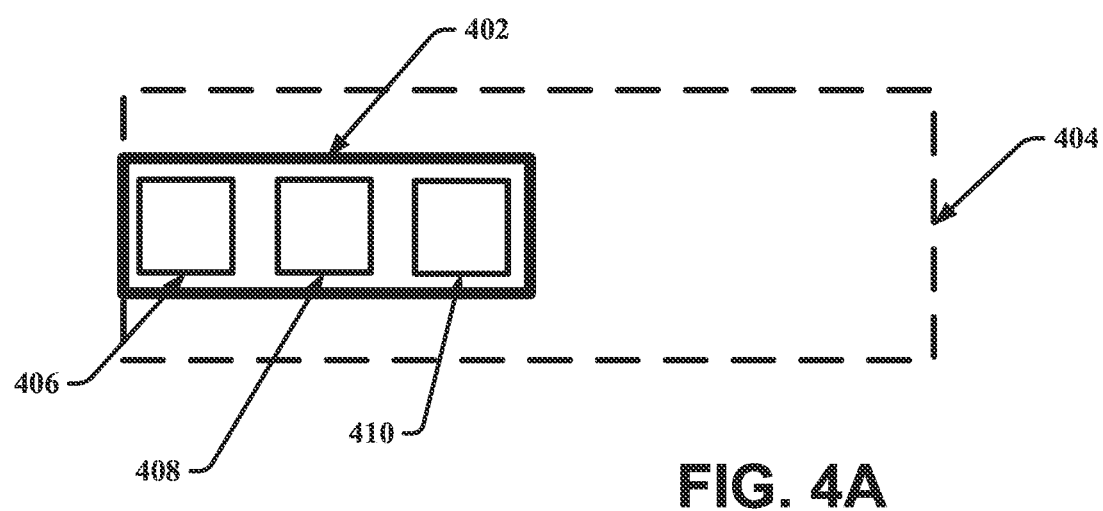
FIGS. 4A-4C respectively illustrate yet another example of a non-limiting device that facilitates automated adjustment of size or configuration of head up display image in a vehicle in accordance with one or more embodiments described herein.
Figure 4B:
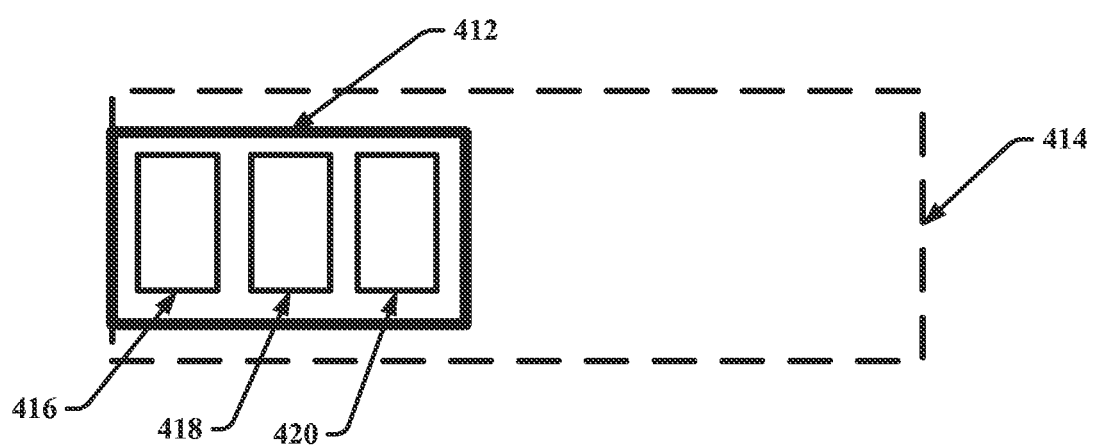
Figure 4C:
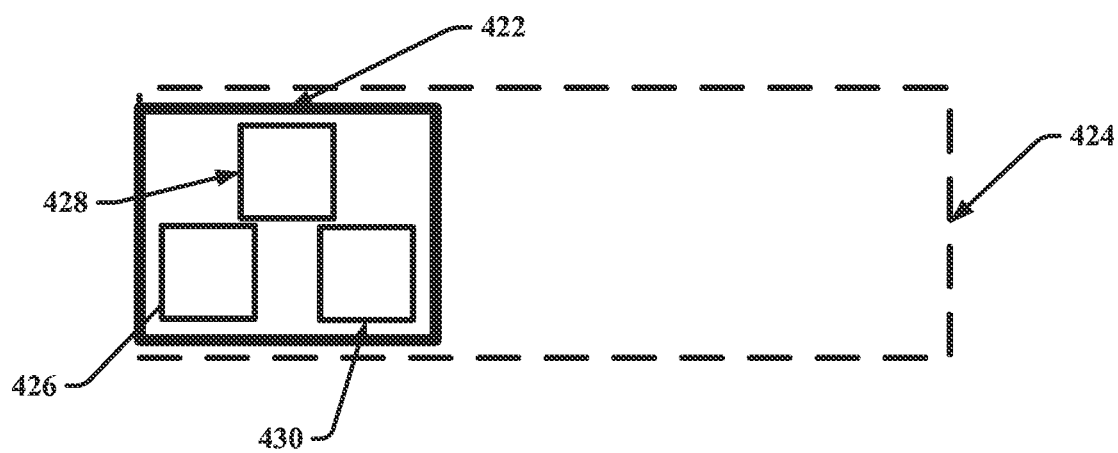

FIGS. 4A-4C respectively illustrate yet another example of a non-limiting device that facilitates automated adjustment of size or configuration of head up display image in a vehicle in accordance with one or more embodiments described herein. Repetitive description of like elements employed in other embodiments described herein is omitted for sake of brevity. FIGS. 4A-4C depict examples of adjustments in size of a HUD image and the content comprising the HUD image. FIG. 4A depicts a HUD image 402 positioned inside an eye box 404 at the far-left edge of the eye box 404 based upon the current position of the eyes or head of the driver of a vehicle. The HUD image 402 is comprised of three content components 406, 408 and 410. FIG. 4B depicts the HUD image 412 positioned inside the eye box 414 that has been compressed horizontally as compared to the HUD image 402. In this example, based upon the change in position of the eyes or head of the driver, the HUD image 412 would have extended beyond the left edge of the eye box 414. In order to prevent the HUD image 412 extending outside the eye box 414 and becoming partially obscured, the horizontal length of the HUD image 412 is compressed. In this example, the vertical length of the HUD image 412 has been increased in order to improve visibility of the HUD image 412. Linear compression is also applied to each of the content components 416, 418 and 420, causing the horizontal length of each content component 416, 418 and 420 to be compressed substantially to the same extent. The vertical length of each content component is also increased substantially to the same extent in order to utilize the additional space created by the increased vertical length of the HUD image 412. FIG. 4C depicts the HUD image 422 positioned inside the eye box 424 that has been compressed horizontally as compared to the HUD image 402. In this example, based upon the change in position of the eyes or head of the driver, the HUD image 422 would have extended beyond the left edge of the eye box 424. In order to prevent the HUD image 422 extending outside the eye box 424 and becoming partially obscured, the horizontal length of the HUD image 422 is compressed. In this example, the vertical length of the HUD image 422 has been increased in order to improve visibility of the HUD image 422. In this example, the content components 416, 418 and 420 are not compressed but are reconfigured within the space of the adjusted HUD image 422.

Figure 5:
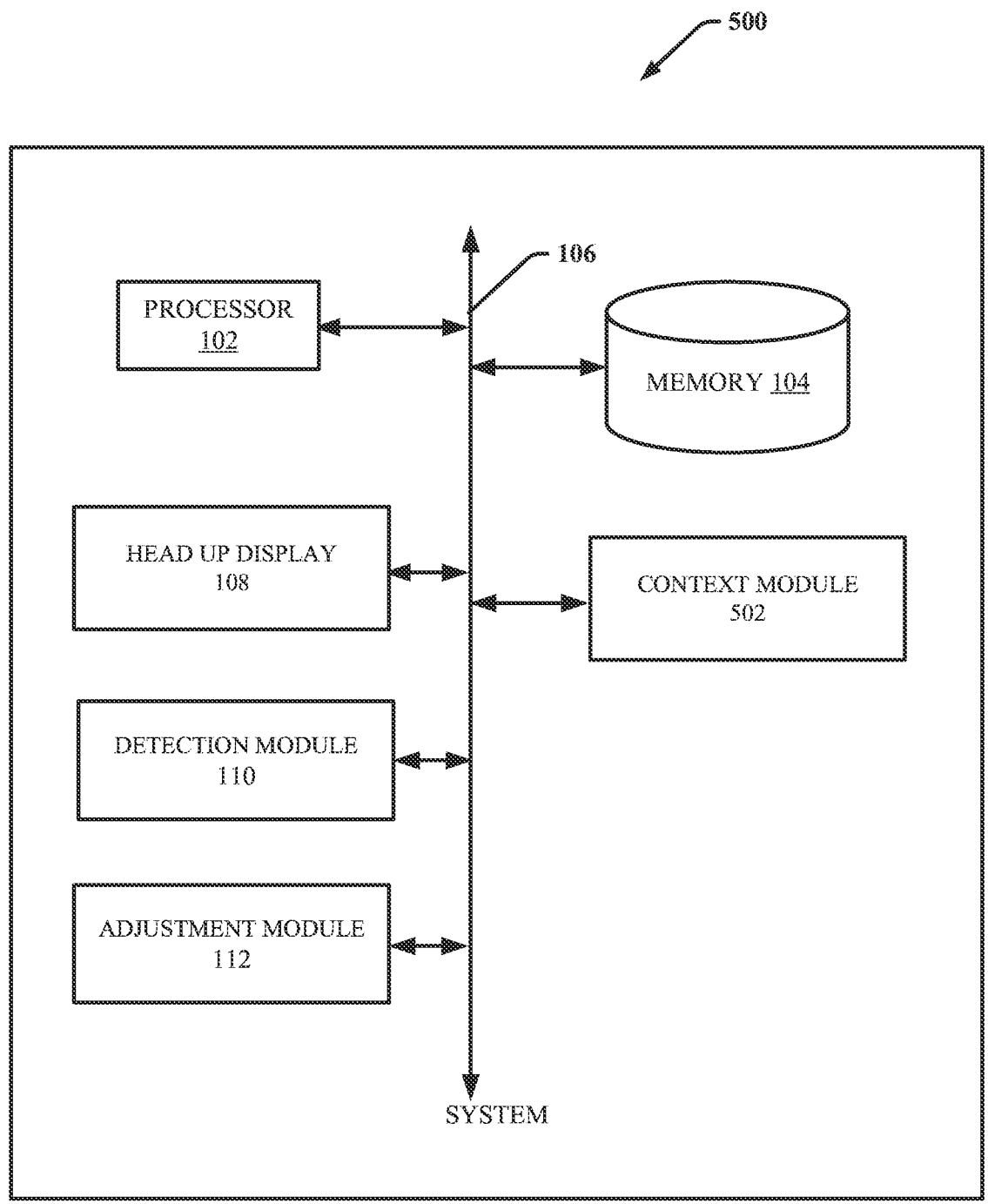
FIG. 5 illustrates a block diagram of another example, non-limiting device that facilitates automated adjustment of size or configuration of head up display image in a vehicle in accordance with one or more embodiments described herein.

FIG. 5 illustrates a block diagram of another example, non-limiting device that facilitates automated adjustment of size or configuration of head up display image in a vehicle in accordance with one or more embodiments described herein. Repetitive description of like elements employed in other embodiments described herein is omitted for sake of brevity. In certain embodiments, the device 500 includes a context module 502 that can identify identity or context of the driver. For example, the context module 502 can identify frequent drivers of a vehicle based upon profiles created by the context module 502 of frequent drivers. In one example, with respect to a vehicle used by a family, the context module 502 can create profiles of each driver in the family that drives the vehicle that includes a photograph of each person. In this example, the context module 502 can utilize one or more cameras and facial recognition software to identify a driver that matches a profile. In another example, the context module 502 can identify a frequent driver using a variety of factors. For example, the context module 502 can identify a frequent driver using selected presets for seat and steering wheel position. In another example, the context module 502 can ask or confirm the identity of a driver using prompts in the vehicle's touch screen controls. In another example, the context module 502 can identify a frequent driver by syncing with the driver's smartphone or other external user device.

In certain embodiments, the context module 502 can identify context of a driver by utilizing global positioning system (GPS) data to determine location and movement of the driver's vehicle. The context module 502 can also utilize data from the vehicle's navigation system to determine the location and movement of the vehicle in relation to roads, intersections, ramps and the like. In another example, the context module 502 can utilize the route generated by the vehicle's navigation system after a destination has been selected by the driver in order determine likely actions taken by the driver associated with operation of the vehicle.

The context module 502 can also utilize data received from systems and devices of the vehicle. For example, the context module 502 can utilize data received from machine vision systems and devices in order to detect traffic signals or the presence of pedestrians, cyclists, obstructions, other vehicles and the like. In another example, the context module 502 can utilize traffic information received wirelessly by the vehicle. The context module 502 can also utilize information received wirelessly by the vehicle from other vehicles associated with location, movement and anticipated movement of each such other vehicle. In yet another example, the context module 502 can utilize data received from devices such as sensors that identify road surface or road conditions.

The context module 502 can also utilize data associated with weather. In one example, the context module 502 can utilize data received from devices in the vehicle such as sensors (e.g., thermometer, barometer, tire pressure, moisture, oil, debris or ice detectors, vehicle operation sensors . . . ) that identify real-time weather conditions.

In an embodiment, data utilized by the context module 502 to determine the vehicle's surroundings such as signs, obstructions, traffic, pedestrians and the like can enable the detection module 110 to determine focus of the driver's attention as the detection module 110 tracks the position of the driver's eyes and head.

In certain embodiments, the context module 502 can also identify likely distractions that are unrelated to the driver's operation of the vehicle and can affect the driver's eye or head movement. For example, a driver accompanied by young children in the vehicle will likely have numerous eye or head movements that are unrelated to the driver's operation of the vehicle.

Figure 6:
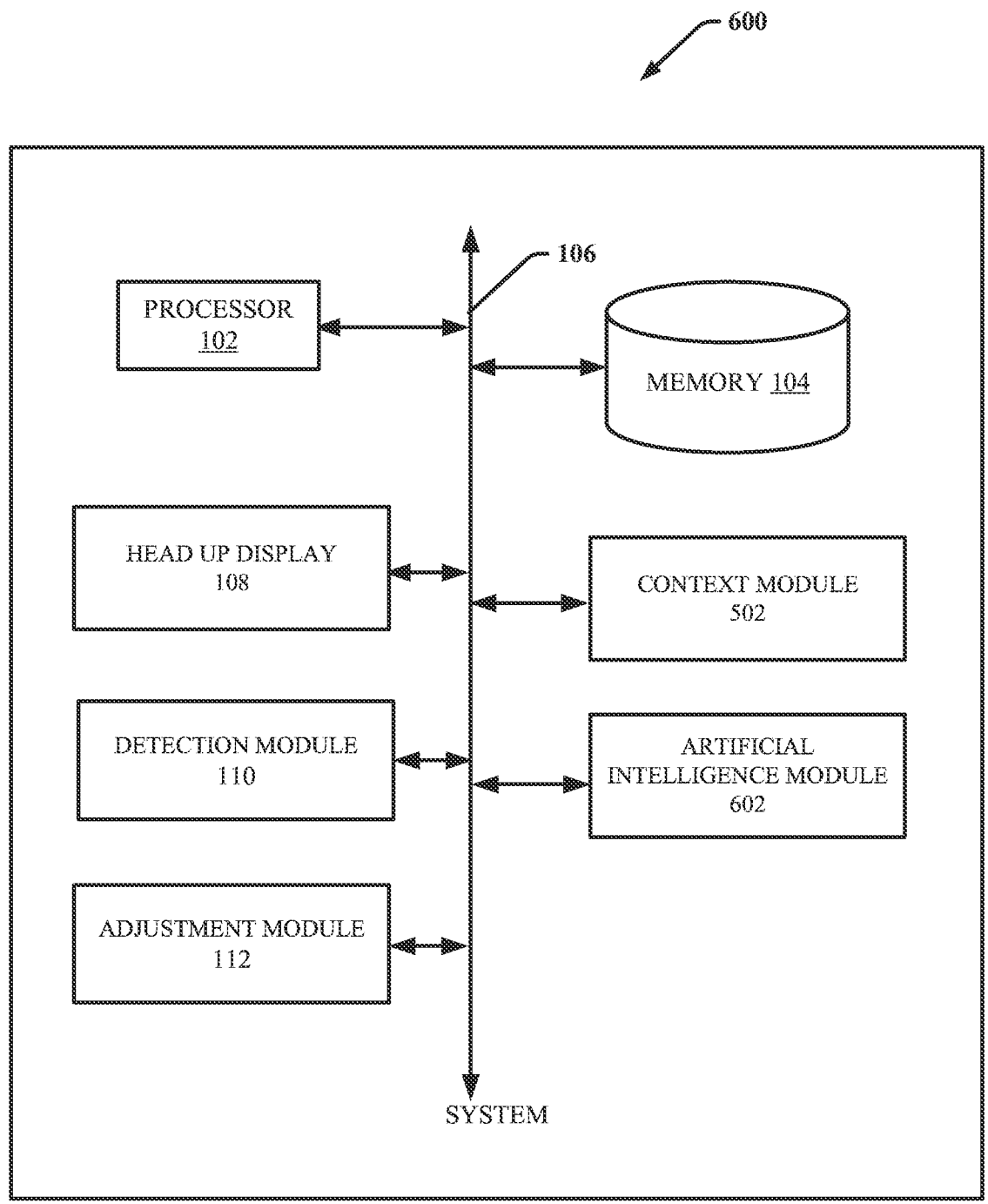
FIG. 6 illustrates a block diagram of yet another example, non-limiting device that facilitates automated adjustment of size or configuration of head up display image in a vehicle in accordance with one or more embodiments described herein.

FIG. 6 illustrates a block diagram of another example, non-limiting device that facilitates automated adjustment of size or configuration of head up display image in a vehicle in accordance with one or more embodiments described herein. Repetitive description of like elements employed in other embodiments described herein is omitted for sake of brevity. In certain embodiments, the device 600 includes an artificial intelligence module 602 can employ a machine learning model to facilitate the adjustment of the HUD image based in part on the driver identity or driver context identified by the context module 502. For example, the artificial intelligence module 602 can employ a machine learning model to enable more optimal positioning or adjustment of the HUD image by limiting adjustments to the positioning or adjustment of the HUD image only in response to changes in eye or head position of the driver most likely associated with the driver's operation of the vehicle. In one example, if the context module 502 has determined that the driver's vehicle is approaching an intersection on a road comprising two lanes in the direction that the vehicle is traveling, the driver will need to position the vehicle in the left lane if the route selected by the driver requires a left turn at the intersection. In this example, the artificial intelligence module 602 can determine that any movements of the driver's eyes or head to the left as the driver moves the vehicle into the left lane or approaches and completes the left turn are associated with the driver's operation of the vehicle. Also, given the context identified by the context module 502, the artificial intelligence module 602 can determine that any glances by the driver to the right as the driver completes a move into the left lane or a left turn is not likely to be associated with the driver's operation of the vehicle. In this case, the artificial intelligence module 602 will prevent the adjustment module 112 from adjusting the position of the HUD image to the right in response to the driver's eye or head movement to the right. The artificial intelligence module 602 will also prevent the adjustment module 112 from adjusting the size or configuration of the HUD image in response to the driver's eye or head movement to the right.

In another example, the context module 502 can determine that the driver's vehicle is traveling on a two-lane freeway comprising two lanes in the direction that the vehicle is traveling and that the vehicle will be traveling on this substantially straight freeway for approximately the next hour until reaching the exit identified by the driver's selected route. In this example, if the driver is traveling in the right lane, the artificial intelligence module 602 can determine that any movements of the driver's eyes or head to the left are more likely to be associated with the driver's operation of the vehicle due to the presence of another lane on the left as compared to any movements of the driver's eyes or head to the right due to no lane being present on the driver's right. If the driver moves to the left lane, then the artificial intelligence module 602 can determine that any movements of the driver's eyes or head to the right are more likely to be associated with the driver's operation of the vehicle due to the presence of another lane on the right as compared to any movements of the driver's eyes or head to the left due to no lane being present on the driver's left after making the lane change.

In another example, the artificial intelligence module 602 can take into account weather conditions or road conditions identified by the context module 502. For example, in the case of slippery roads due to rain or snow, the driver is likely to look down more often towards the roads surface on the road ahead. In this example, the artificial intelligence module 602 can determine that changes in the driver's eye or head position in a downward motion are more likely to be associated with the driver's operation of the vehicle as opposed to situations involving good weather or road conditions.

In another example, the artificial intelligence module 602 can take into account the focus of the driver's attention as determined by the context module 502. For example, the artificial intelligence module 602 can determine that changes in the driver's eye or head position are associated with the driver's operation of the vehicle when the driver's attention is focused on road obstructions, traffic lights, road signs, other vehicles and the like.

In another example, the artificial intelligence module 602 can determined that certain eye and head movements by the driver should be disregarded by the adjustment module 112. For example, glances by towards the rear-view mirror or side mirror can be disregarded as such movements are not likely to affect the driver's eye or head position when the driver's focus returns to the road ahead.

In another example, the artificial intelligence module 602 can detect patterns associated with a driver's eye or head movements associated with driver context. For example, the artificial intelligence module 602 can detect differences associated with a driver's most common eye or head positions on a freeway as compared to city driving. In another example, the artificial intelligence module 602 can detect patterns associated with data collected by the context module 502. For example, the artificial intelligence module 602 can detect traffic patterns associated with the driver's daily commute to and from work.

In an embodiment, the artificial intelligence module 602 can prioritize the content components within the HUD image as the adjustment module 112 adjusts the size or configuration of the HUD image. For example, if the driver is traveling on a predetermined route in bad weather, the artificial intelligence component 602 can prioritize content components associated with route and weather in situations where the adjustment module 112 will be compressing one of the three content components in response to the driver's eye or head position. In this example, the configuration of the content of the HUD image will adjusted so that the content components associated with route and weather are not compressed and the content component assigned a lower priority by the artificial intelligence module 602 is compressed.

In an embodiment, the artificial intelligence module 602 can anticipate likely driver eye or head movement based on driver identity or context and adjust position of a HUD image based on the anticipated eye or head movement. For example, if a route selected by the driver calls for a right turn at the next intersection, the artificial intelligence module 602 can anticipate that the driver will be moving the drivers eyes or head to the right as the driver approaches and completes the right turn and cause the adjustment module 112 to adjust the position of the HUD image or size or configuration of the HUD image in accordance with such anticipated eye or head movement. In another example, if the brake lights are illuminated in vehicle in front of the driver's vehicle and the vehicle begins to rapidly reduce speed, the artificial intelligence module 602 can anticipate that the driver's eye or head position will be lowered as the driver begins to reduce speed.

In another example, the artificial intelligence module 602 can anticipate likely driver eye or head movement based on patterns detected associated with driver eye or head movement. For example, a driver's eye or head movement can vary depending on factors such as traffic, weather, speed and the like.

In an embodiment, the artificial intelligence module 602 can adjust position of the HUD image based upon a determination by the artificial intelligence module 602 of optimal eye or head position for a driver. For example, the artificial intelligence module 602 can detect a pattern that the driver often brakes too late when approaching a stopped vehicle in the path of the driver's vehicle. In this example, the artificial intelligence module 602 can lower the position of the HUD image as the driver's vehicle approaches a stopped vehicle in order to prompt the driver to lower the driver's line of sight and see the stopped vehicle and begin applying the brakes.

In an embodiment, the artificial intelligence module 602 can convey messages to the driver in the form of graphic, text or sound alerts. For example, if the position, size or configuration of the HUD image has been adjusted due to an identified obstruction in the road ahead, the HUD can utilize a graphic, text or sound alert to notify the driver of the reason behind the change in HUD image position, size or configuration.

In an embodiment, if a vehicle's automated driving system is engaged and the driver is no longer operating the vehicle, the HUD can become an entertainment system for the driver that is adjusted by the artificial intelligence module 602 to optimize the entertainment experience of the driver. For example, the artificial intelligence module 602 can adjust the size and position of the HUD image based upon the driver's eye and head position and limit movement of the HUD image to adjustments in the driver's seating position. In this example, the artificial intelligence module 602 can cause the HUD image to revert to its default settings once the artificial intelligence module 602 determines that the vehicle's automated driving system has been or is about to be disengaged.

In an embodiment, the artificial intelligence module 602 can perform a utility-based analysis that factors cost of adjusting position, size or configuration of the HUD image versus benefit. For example, any adjustment in position, size or configuration of the HUD image in response to eye or head movement not directly associated with driver operation of the vehicle can be a distraction to the driver. Also, multiple adjustments in a short period of time can increase distractions. Meanwhile, the artificial intelligence module 602 can determine the probability that a particular eye or head movement is associated with driver operation of the vehicle. In this example, the artificial intelligence module 602 can weigh the probability that a particular eye or head movement is associated with driver operation of the vehicle against the likelihood that adjusting the position, size or configuration of the HUD image in response will distract the driver.

In this regard, the artificial intelligence module 602 can perform classifications, correlations, inferences and/or expressions associated with principles of artificial intelligence. For instance, the artificial intelligence module 602 can employ an automatic classification system and/or an automatic classification. In one example, the artificial intelligence module 602 can employ a probabilistic and/or statistical-based analysis (e.g., factoring into the analysis utilities and costs) to learn and/or generate inferences. The artificial intelligence module 602 can employ any suitable machine-learning based techniques, statistical-based techniques and/or probabilistic-based techniques. For example, the artificial intelligence module 602 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the artificial intelligence module 602 can perform a set of machine learning computations. For example, the artificial intelligence module 602 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 7:
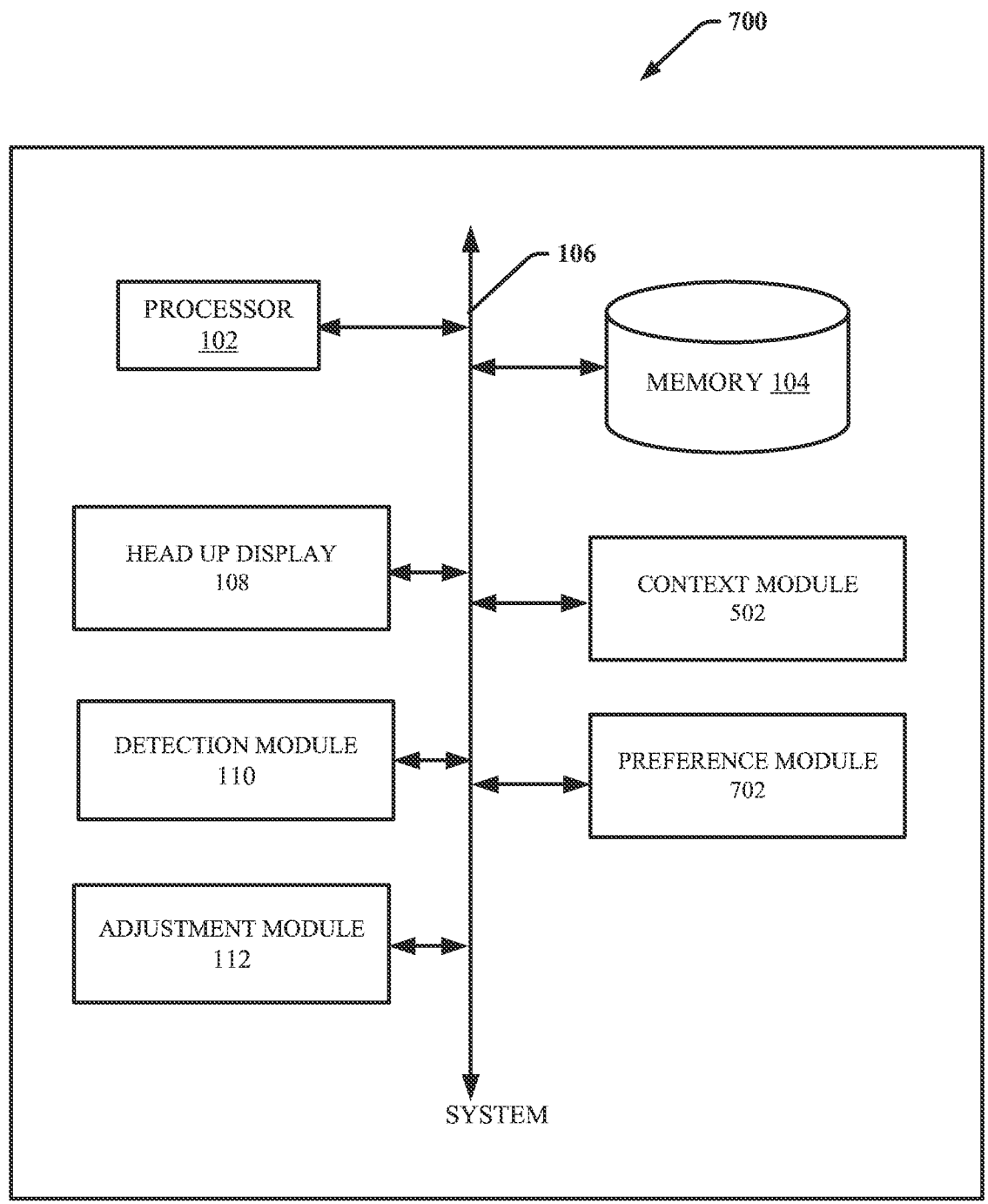
FIG. 7 illustrates a block diagram of yet another example, non-limiting device that facilitates automated adjustment of size or configuration of head up display image in a vehicle in accordance with one or more embodiments described herein.

FIG. 7 illustrates a block diagram of another example, non-limiting device that facilitates automated adjustment of size or configuration of head up display image in a vehicle in accordance with one or more embodiments described herein. Repetitive description of like elements employed in other embodiments described herein is omitted for sake of brevity. In certain embodiments, the device 700 includes a preference module 702 that can set image display parameters in response to driver preferences. For example, a driver can select preferences associated with size or configuration adjustments of the HUD image. For example, a driver can indicate a preference for linear compression as opposed to nonlinear compression of content components within the HUD image. In another example, a driver can indicate a preference that any horizontal compression of the HUD image also include an increase in the vertical length of the HUD image. In another example, the preference module 702 can enable a driver to select settings associated with the extent to which HUD image adjustments are optimized. A driver can indicate a preference that the position, size or configuration of the HUD image be adjusted in response to all eye or head movements or that adjustments be optimized based upon driver context. In another example, a driver can indicate preferences as to the extent to which HUD image adjustments are made in different contexts. For example, a driver can indicate a preference that HUD image adjustments are only made when the driver's vehicle is traveling on the freeway or over fifty miles per hour. In another example, a driver can indicate a preference only vertical or horizontal HUD image adjustments can be made. In another example, the HUD image settings selected by a driver can be stored in a cloud and implemented on any suitable vehicle the driver is using.

Figure 8:
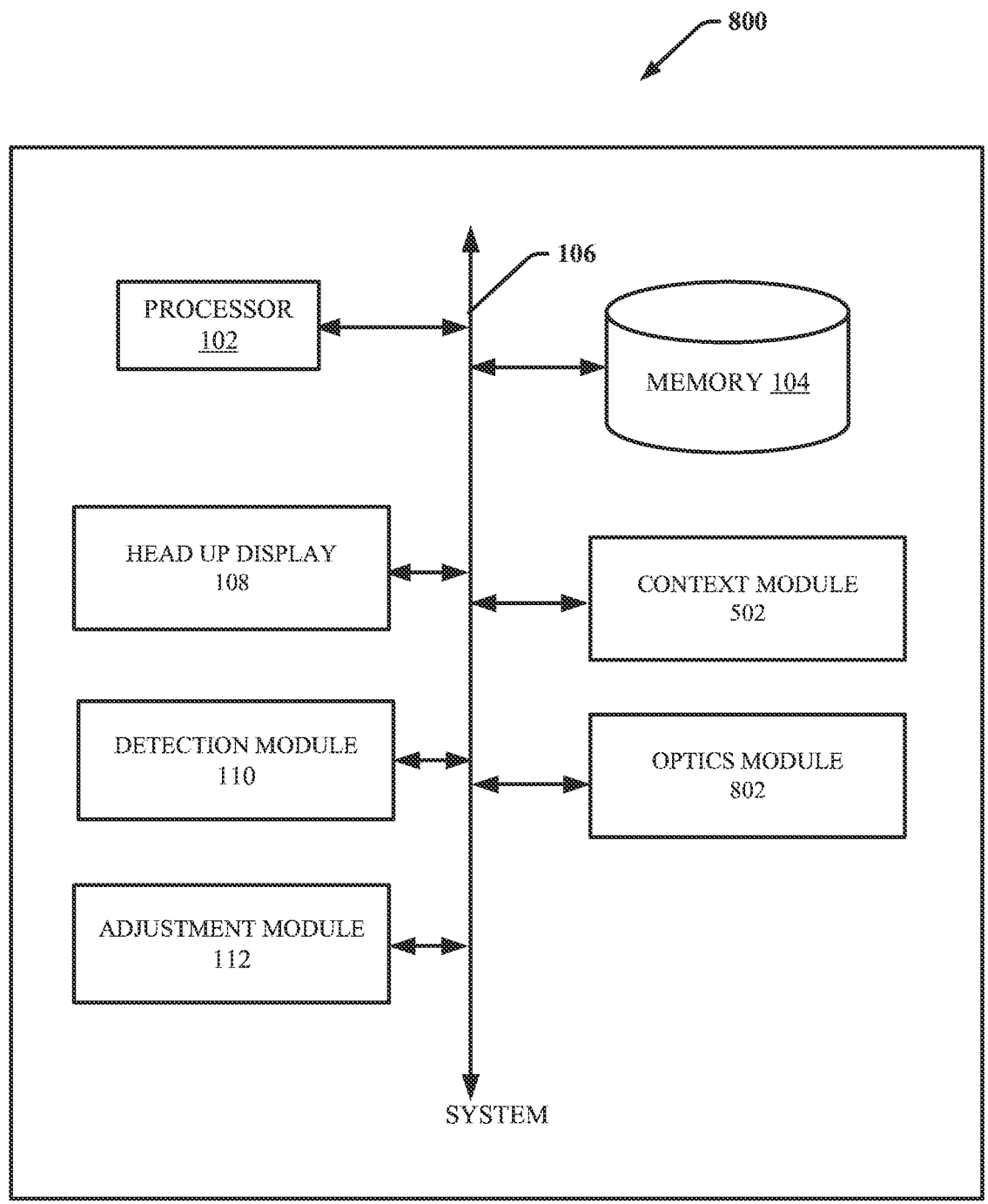
FIG. 8 illustrates a block diagram of yet another example, non-limiting device that facilitates automated adjustment of size or configuration of head up display image in a vehicle in accordance with one or more embodiments described herein.

FIG. 8 illustrates a block diagram of yet another example, non-limiting device that facilitates automated adjustment of size or configuration of head up display image in a vehicle in accordance with one or more embodiments described herein. Repetitive description of like elements employed in other embodiments described herein is omitted for sake of brevity. In certain embodiments, the device 800 includes an optics module 802 that can modify the image display in response to driver's eye prescription. For example, as the adjustment module 112 adjusts position of the HUD image, the optics module 802 can modify the size of the HUD image or the content within the HUD image based on the driver's eye prescription in order to enhance the ability of the driver to read the content of the HUD image. For example, the content within the HUD image can be adjusted for color, brightness, contrast, opacity and the like. In another example, the optics module 802 can modify the position, size or configuration of the HUD image determined by the adjustment module 112 in order to optimize the driver's ability to read the content of the HUD image. In another example, if the driver is not wearing the driver's prescription lenses, the optics module 802 can modify the size of the HUD image or the content within the HUD image to emulate the effect of prescription lenses used by the driver.

Figure 9:
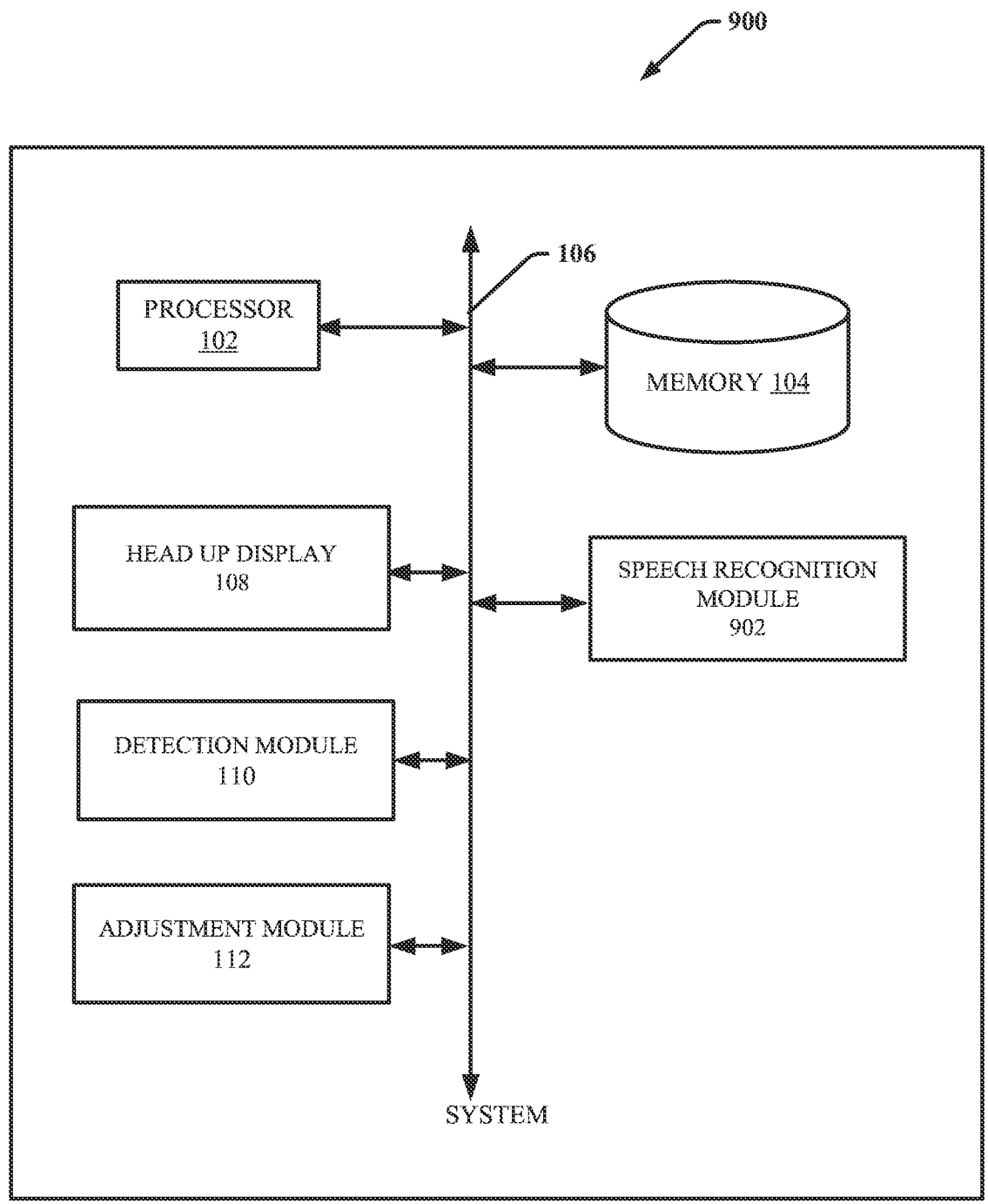
FIG. 9 illustrates a block diagram of yet another example, non-limiting device that facilitates automated adjustment of size or configuration of head up display image in a vehicle in accordance with one or more embodiments described herein.

FIG. 9 illustrates a block diagram of another example, non-limiting device that facilitates automated adjustment of size or configuration of head up display image in a vehicle in accordance with one or more embodiments described herein. Repetitive description of like elements employed in other embodiments described herein is omitted for sake of brevity. In certain embodiments, the device 900 includes a speech recognition module 902 that can receive audio instructions from the driver in connection with adjusting the image. For example, the speech recognition module 902 can enable the driver to give audio instructions to adjust the size or configuration of the HUD image. In another example, the speech recognition module 902 can enable the driver to give audio instructions to move the HUD image up or down or to the left or right. In another example, the driver can give audio instructions that the HUD image stop moving as a result of the driver's eye or head movement. In another example, the driver can give more general instructions regarding movements, size or configuration of the HUD image. For example, the driver can give audio instructions that the HUD image should only be adjusted as a result of the driver's eye or head movement when the vehicle is traveling on a freeway.

Figure 10:
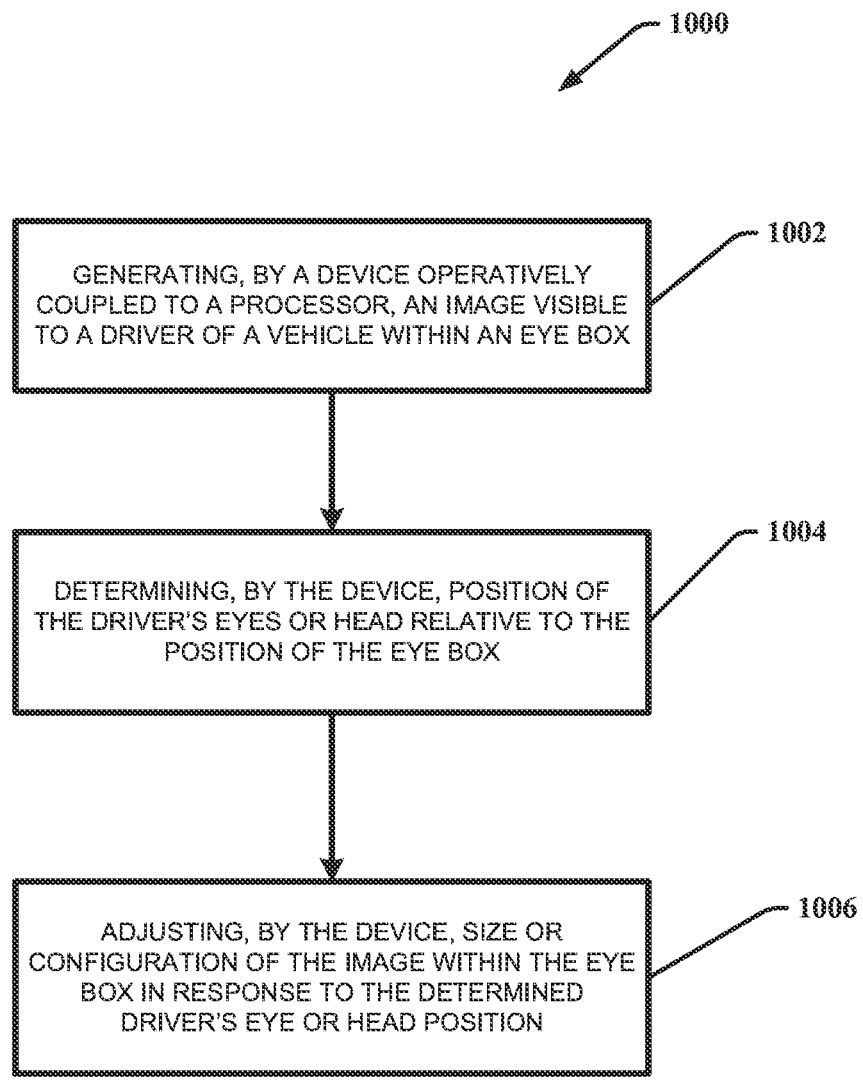
FIG. 10 illustrates a flow diagram of an example of a method to facilitate automated adjustment of size or configuration of head up display image in a vehicle in accordance with one or more embodiments described herein.

FIG. 10 illustrates a flow diagram of an example of a method to facilitate automated adjustment of size or configuration of head up display image in a vehicle in accordance with one or more embodiments described herein. Repetitive description of like elements employed in other embodiments described herein is omitted for sake of brevity. 1002 represents a first act that includes generating an image visible to a driver of a vehicle within an eye box (e.g., via the head up display 108). At 1004 position of the driver's eyes or head relative to position of the eye box is determined (via the detection module 110). At 1006, size or configuration of the image within the eye box is adjusted in response to the determined driver's eye or head position (e.g., via the adjustment module 112).

In certain embodiments, at 1006, the adjustment module 112 adjusts size or configuration of the image within the eye box in response to position of the vehicle's steering wheel or the driver's hands. In another embodiment, at 1006, the context module 502 identifies identity or context of the driver. In another embodiment, at 1006, the artificial intelligence module 602 employs a machine learning model to facilitate the adjustment of the image based in part on the identified driver identity or driver context.

Figure 11:
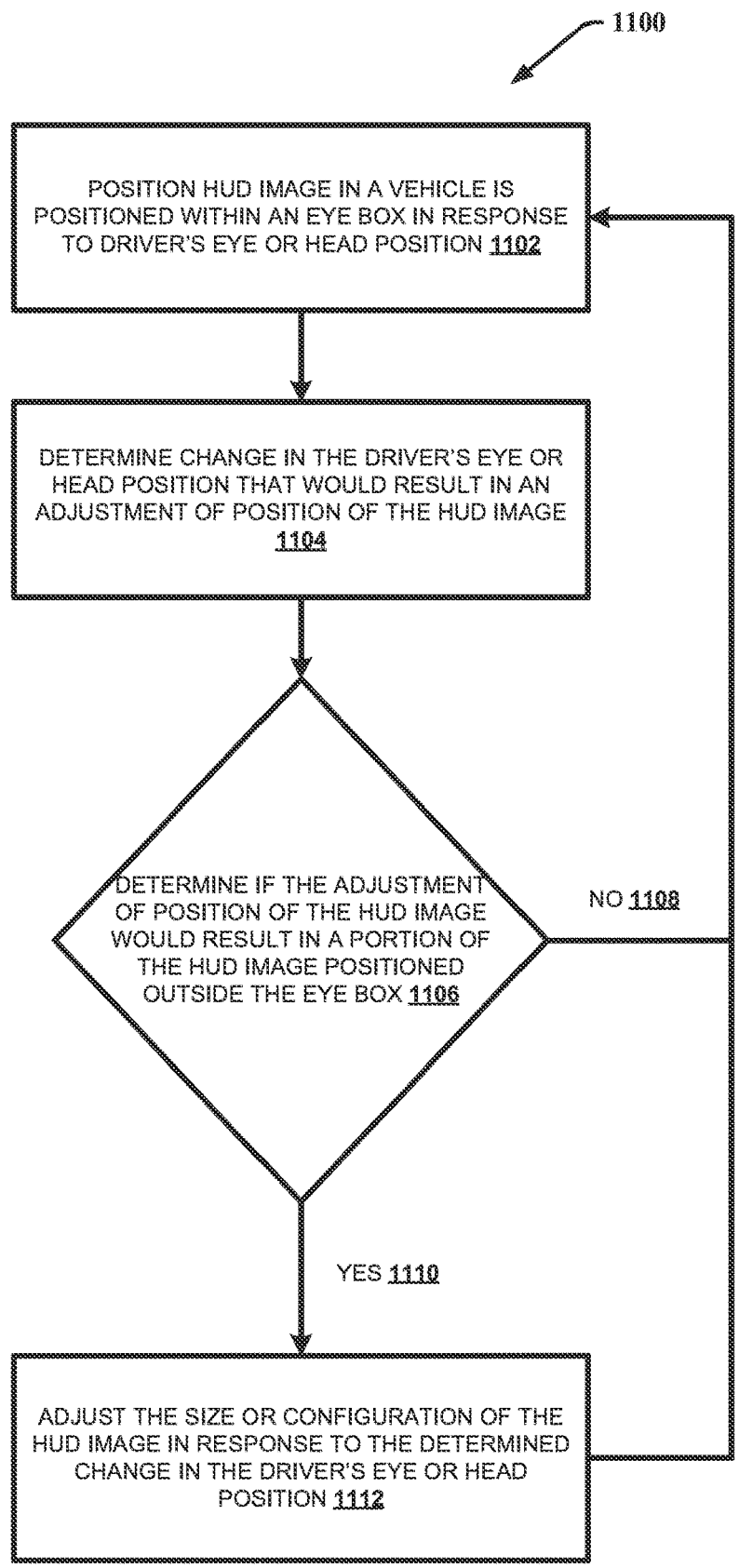
FIG. 11 illustrates a flow diagram of an example of a method to facilitate automated adjustment of size or configuration of head up display image in a vehicle in accordance with one or more embodiments described herein.

FIG. 11 illustrates another basic method flowchart 1100 of functional acts within various embodiments. Repetitive description of like elements employed in other embodiments described herein is omitted for sake of brevity. The method to facilitate automated adjustment of size or configuration of head up display image in a vehicle illustrated in FIG. 11 can be implemented in the device 100 of FIG. 1. As such, reference is to be made to the example of FIG. 1 in the following discussion of the example of FIG. 11.

Thus, in the example of FIG. 11, a sequence to facilitate automated adjustment of size or configuration of head up display image in a vehicle 1100 is outlined. The sequence begins at 1102 where a HUD image in a vehicle is positioned within an eye box in response to driver's eye or head position. At 1104, a change in the driver's eye or head position is determined that would result in an adjustment of position of the HUD image. At 1106, it is determined if the adjustment of position of the HUD image would result in a portion of the HUD image positioned outside the eye box. For example, if the driver's eyes or head move to the left as the driver is beginning a left turn, it can be determined that the adjusted position of the HUD image in response to the driver's eye or head position would in result in a portion of the HUD image positioned outside the eye box. If it is determined that the driver's change in eye or head position would not result in a portion of the HUD image positioned outside the eye box 1108, the size and configuration of the HUD image at 1102 is unchanged. If it is determined that the driver's change in eye or head position would in result in a portion of the HUD image positioned outside the eye box 1110, at 1112, the size or configuration of the HUD image is adjusted in response to the determined change in the driver's eye or head position.

The one or more embodiments of the present invention may be a system, device, a method, an apparatus and/or a computer program product at any possible technical detail level of integration. The computer program product can include a computer readable storage medium (or media)

having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Various aspects of the present invention are described herein with reference to flowchart illustrations and/or block diagrams of methods, apparatus (systems or devices), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems or devices, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. It will also be noted that each block of the block diagrams and/or flowchart illustration, and combinations of blocks in the block diagrams and/or flowchart illustration, can be implemented by special purpose hardware-based systems or devices that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "module," "component," "system," "device," "platform," "interface," and the like, can refer to and/or can include a computer-related entity or an entity related to an operational machine with one or more specific functionalities. The entities disclosed herein can be either hardware, a combination of hardware and software, software, or software in execution. For example, a module can be, but is not limited to being, a process running on a processor, a processor, an object, an executable, a thread of execution, a program, and/or a computer. By way of illustration, both an application running on a server and the server can be a module. One or more modules can reside within a process and/or thread of execution and a module can be localized on one computer and/or distributed between two or more computers. In another example, respective modules can execute from various computer readable media having various data structures stored thereon. The modules can communicate via local and/or remote processes such as in accordance with a signal having one or more data packets (e.g., data from one module interacting with another module in a local system, distributed system, and/or across a network such as the Internet with other systems via the signal). As another example, a module can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a module can be an apparatus that provides specific functionality through electronic modules without mechanical parts, wherein the electronic modules can include a processor or other means to execute software or firmware that confers at least in part the functionality of the electronic modules. In an aspect, a module can emulate an electronic module via a virtual machine, e.g., within a cloud computing system.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware modules, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage module relevant to operation and functionality of a module are utilized to refer to "memory modules," entities embodied in a "memory," or modules comprising a memory. It is to be appreciated that memory and/or memory modules described herein can be either volatile memory or nonvolatile memory, or can include both volatile and nonvolatile memory. Additionally, the disclosed memory modules of systems or devices or computer-implemented methods herein are intended to include, without being limited to including, these and any other suitable types of memory.

What has been described above include mere examples of systems or devices and computer-implemented methods. It is, of course, not possible to describe every conceivable combination of modules or computer-implemented methods for purposes of describing one or more embodiments, but one of ordinary skill in the art can recognize that many further combinations and permutations of these embodiments are possible. The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The terminology used herein was chosen to best explain the principles of the embodiments, the practical application or technical improvement over technologies found in the marketplace, or to enable others of ordinary skill in the art to understand the embodiments disclosed herein. In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Further aspects of the invention are provided by the subject matter of the following clauses:

1. A device, comprising: a processor that executes computer executable modules stored in memory; a head up display that generates an image visible to a driver of a vehicle within an eye box; a detection module that determines position of the driver's eyes or head relative to position of the eye box; and an adjustment module that adjusts size or configuration of the image within the eye box in response to the determined driver's eye or head position.
2. The device of any preceding clause wherein the adjustment module adjusts size of the image within the eye box by linear or nonlinear compression of content within the image.
3. The device of any preceding clause wherein the adjustment module adjusts configuration of the image within the eye box based upon importance or relevancy of content within the image.
4. The device of any preceding clause wherein the adjustment module adjusts size or configuration of the image within the eye box in response to content in the vehicle's instrument cluster or central display that is obstructed by the vehicle's steering wheel or at least one of the driver's hands.
5. The device of any preceding clause further comprising a context module that identifies identity or context of the driver.
6. The device of any preceding clause further comprising an artificial intelligence module that employs a machine learning model to facilitate the adjustment of the image based in part on the identified driver identity or driver context.
7. The device of any preceding clause further comprising a speech recognition module that receives audio instructions from the driver in connection with adjusting the image.
8. The device of any preceding clause further comprising an optics module that modifies the image in response to driver's eye prescription.

9. The device of any preceding clause wherein the detection module determines focus of driver attention.
10. The device of any preceding clause further comprising a camera that captures images of the driver.
11. The device of any preceding clause further comprising a preference module that sets image display parameters in response to driver preferences.
12. The device of any preceding clause wherein the context module identifies the context of the vehicle.
13. The device of clause 1 above with any set of combinations of the devices of clauses 2-12 above.
14. A computer-implemented method comprising: generating, by a device operatively coupled to a processor, an image visible to a driver of a vehicle within an eye box; determining, by the device, position of the driver's eyes or head relative to position of the eye box; and adjusting, by the device, size or configuration of the image within the eye box in response to the determined driver's eye or head position.
15. The method of any preceding clause further comprising adjusting size of the image within the eye box by linear or nonlinear compression of content within the image.
16. The method of any preceding clause further comprising adjusting configuration of the image within the eye box based upon importance or relevancy of content within the image.
17. The method of any preceding clause further comprising adjusting size or configuration of the image within the eye box in response to content in the vehicle's instrument cluster or central display that is obstructed by the vehicle's steering wheel or at least one of the driver's hands.
18. The method of any preceding clause further comprising identifying identity or context of the driver.
19. The method of any preceding clause further comprising employing a machine learning model to facilitate the adjustment of the image based in part on the identified driver identity or driver context.
20. The method of any preceding clause further comprising receiving audio instructions from the driver in connection with adjusting the image.
21. The method of any preceding clause further comprising modifying the image in response to the driver's eye prescription.
22. The method of any preceding clause further comprising determining focus of driver attention.
23. The method of any preceding clause further setting image display parameters in response to driver preferences.
24. The method of any preceding clause further comprising identifying the context of the vehicle.
25. The method of clause 14 above with any set of combinations of the methods of clauses 15-24 above.
26. A computer program product comprising a computer readable storage medium having program instructions embodied therewith, the program instructions are executable by a processor to cause the processor to: generate, by the processor, an image visible to a driver of a vehicle within an eye box; determine, by the processor, position of the driver's eyes or head relative to position of the eye box; and adjust, by the processor, size or configuration of the image within the eye box in response to the determined driver's eye or head position.

What is claimed is:
1. A system, comprising:
a memory that stores computer executable modules;
a processor, operably coupled to the memory, and that executes the computer executable modules stored in the memory, wherein the computer executable modules comprise:
a detection module that determines a movement of a part of a driver of a vehicle that results in a first portion of a projection area of a head up display not being visible to the driver based on a position of the part of the driver relative to the projection area; and
an adjustment module that determines whether to adjust the projection area based on the movement of the part of the driver, comprising:
in response to determining that the movement is a first type of movement, adjust at least one of a size of an image projected in the projection area by the head up display or a configuration of content components in the image to be within a second portion of the projection area that is visible to the driver, and
in response to determining that the movement is a second type of movement, forego adjustment of the size of the image and the configuration of the content components in the image.
2. The system of claim 1, wherein the part comprises an eye of the driver.
3. The system of claim 1, wherein the part comprises a head of the driver.
4. The system of claim 1, wherein the first type of movement is associated with an operation of the vehicle being performed by the driver, and the second type of movement is not associated with any operation of the vehicle being performed by the driver.
5. The system of claim 1, wherein the adjustment module adjusts the image based further on an identity of the driver.
6. The system of claim 1, wherein the adjustment module adjusts the image based further on a context determined for the driver.
7. The system of claim 1, wherein the adjustment module adjusts the image based further on respective priorities determined for the content components.
8. A computer-implemented method comprising:
determining, by a system comprising a processor, a movement of a body part of a driver of a vehicle that results in a first portion of a projection region of a head up display not being visible to the driver based on a position of the body part of the driver relative to the projection region; and
determining, by the system, whether to adjust the projection region based on the movement of the body part of the driver, comprising:
in response to determining that the movement is a first type of movement, adjusting, by the system, at least one of a size of an image projected in the projection region by the head up display or a configuration of content components in the image to be within a second portion of the projection region that is visible to the driver; and
in response to determining that the movement is a second type of movement, foregoing, by the system, adjustment of the size of the image and the configuration of the content components in the image.
9. The method of claim 8, wherein the body part comprises an eye of the driver.

10. The method of claim 8, wherein the body part comprises a head of the driver.

11. The method of claim 8, wherein the first type of movement is associated with an operation of the vehicle being performed by the driver, and the second type of movement is not associated with any operation of the vehicle being performed by the driver.

12. The method of claim 8, further comprising adjusting, by the system, the image based further on an identity of the driver.

13. The method of claim 8, further comprising adjusting, by the system, the image based further on a context determined for the driver.

14. The method of claim 8, further comprising adjusting, by the system, the image based further on respective priorities determined for the content components.

15. A computer program product comprising a computer readable storage medium having program instructions embodied therewith, the program instructions are executable by a processor to cause the processor to:
 determine a movement of a body part of a driver of a vehicle that results in a first portion of a projection field of a head up display not being visible to the driver based on a position of the body part of the driver relative to the projection field;
 determining whether to adjust the projection field based on the movement of the body part of the driver, comprising:
  in response to determining that the movement is a first type of movement, adjusting at least one of a size of an image projected in the projection field by the head up display or a configuration of content components in the image to be within a second portion of the projection field that is visible to the driver; and
  in response to determining that the movement is a second type of movement, foregoing adjustment of the size of the image and the configuration of the content components in the image.

16. The computer program product of claim 15, wherein the body part comprises an eye of the driver.

17. The computer program product of claim 15, wherein the body part comprises a head of the driver.

18. The computer program product of claim 15, wherein the first type of movement is associated with an operation of the vehicle being performed by the driver, and the second type of movement is not associated with any operation of the vehicle being performed by the driver.

19. The computer program product of claim 15, wherein the program instructions further cause the processor to:
 adjust the image based further on an identity of the driver.

20. The computer program product of claim 15, wherein the program instructions further cause the processor to:
 adjust the image based further on verbal instructions from the driver.

\* \* \* \* \*